US007843252B2

(12) United States Patent
Schubert

(10) Patent No.: US 7,843,252 B2
(45) Date of Patent: Nov. 30, 2010

(54) CIRCUIT WITH A REGULATED CHARGE PUMP

(75) Inventor: Andreas Schubert, Dresden (DE)

(73) Assignee: Atmel Automotive GmbH, Heilbronn (DE)

( * ) Notice: Subject to any disclaimer, the term of this patent is extended or adjusted under 35 U.S.C. 154(b) by 0 days.

(21) Appl. No.: 12/490,062

(22) Filed: Jun. 23, 2009

(65) Prior Publication Data
US 2009/0315599 A1 Dec. 24, 2009

Related U.S. Application Data

(60) Provisional application No. 61/074,802, filed on Jun. 23, 2008.

(30) Foreign Application Priority Data
Jun. 23, 2008 (DE) .................. 10 2008 029 409

(51) Int. Cl.
 *G05F 1/10* (2006.01)
(52) U.S. Cl. .................................................. 327/536
(58) Field of Classification Search ................ 327/534, 327/535, 536, 537
 See application file for complete search history.

(56) References Cited

U.S. PATENT DOCUMENTS

| 5,258,662 | A | 11/1993 | Skovmand | |
|---|---|---|---|---|
| 6,172,886 | B1 | 1/2001 | Lauterbach et al. | |
| 6,518,830 | B2 | 2/2003 | Gariboldi et al. | |
| 7,710,194 | B2 * | 5/2010 | Kang | 327/536 |
| 7,724,072 | B2 * | 5/2010 | Baek et al. | 327/536 |

FOREIGN PATENT DOCUMENTS

| DE | 196 27 197 C1 | 3/1998 |
|---|---|---|
| DE | 600 28 030 T2 | 12/2006 |
| JP | 2003-168963 | 3/2003 |

* cited by examiner

*Primary Examiner*—Jeffrey S Zweizig
(74) *Attorney, Agent, or Firm*—Muncy, Geissler, Olds & Lowe, PLLC

(57) ABSTRACT

A circuit, method for regulation, and use thereof is provided, whereby the circuit can include a charge pump that is connected to a supply voltage terminal in order to produce a pump voltage from a supply voltage, and includes a control circuit whose inputs are connected to the output of the charge pump and to the supply voltage terminal in order to sense a difference between the pump voltage and the supply voltage as a controlled variable. The circuit is designed to compare the controlled variable to a reference variable, and output is connected to a control input of the charge pump in order to control the charge pump as a function of the comparison.

10 Claims, 2 Drawing Sheets

CIRCUIT WITH A REGULATED CHARGE PUMP

This nonprovisional application claims priority to German Patent Application No. 102008029409.8, which was filed in Germany on Jun. 23, 2008, and to U.S. Provisional Application No. 61/074,802, which was filed on Jun. 23, 2008, and which are both herein incorporated by reference.

BACKGROUND OF THE INVENTION

1. Field of the Invention

The present invention relates to a circuit with a regulated charge pump, a regulation method, and a use thereof.

2. Description of the Background Art

Known from DE 196 27 197 C1, which corresponds to U.S. Pat. No. 6,172,886, is a device for voltage multiplication with a low dependence of the output voltage on the supply voltage. This is required for programming flash EEPROMs. A regulation of the output voltage is accomplished here.

Known from DE 600 28 030 T2, which corresponds to U.S. Pat. No. 6,518,830, is an electronic circuit for generating and regulating a voltage with a charge pump voltage multiplier which is connected to an oscillator.

Regulation is a process in which a quantity, the controlled variable (quantity to be regulated), is continuously sensed, compared to another quantity—the reference variable—and influenced in order to approach the reference variable.

SUMMARY OF THE INVENTION

It is therefore an object of the present invention to provide a circuit with a charge pump. Accordingly, a circuit is provided, whereby many of the components of the circuit can be monolithically integrated on a semiconductor chip.

The circuit has a charge pump that can be connected to a supply voltage terminal in order to produce a pump voltage from the supply voltage. The supply voltage is provided, for example, by a battery that can be connected to the circuit.

In addition, the circuit has a control circuit. The control circuit can be connected to a feedback path for regulation. The inputs of the control circuit are connected to the output of the charge pump as a feedback path and to the supply voltage terminal.

The control circuit is designed to sense a difference between the pump voltage and the supply voltage. The difference here constitutes a controlled variable. The control circuit is designed to compare the controlled variable to a reference variable.

The output of the control circuit is connected to a control input of the charge pump in order to control the charge pump as a function of the comparison. The control circuit and charge pump, together with the feedback path, form a control loop here.

A further object of the invention is to provide a method for regulation with a charge pump.

In the method, a difference between a pump voltage at the output of the charge pump and a supply voltage is measured.

The difference, or a quantity derived therefrom, is compared with a reference value.

As a function of the comparison, a control signal for controlling the charge pump for generating the pump voltage from the supply voltage is changed, in particular is activated or deactivated.

The invention has the additional object of specifying a use. Accordingly, a use is provided of a difference measurement between a supply voltage and a pump voltage for regulating the difference between the supply voltage and pump voltage to a gate voltage that is set for switching on a high side transistor of a load bridge. The load bridge can be a full bridge or half bridge that is preferably connected to an electric motor of an actuating system of a motor vehicle.

The improvements described below relate to the circuit as well as to the use and to the method. Features of the use and of the method, in particular, can be derived from the functionality of the circuit.

According to an embodiment, the circuit has a power transistor that is connected to the supply voltage terminal. The output of the charge pump can be connected to a control input of the power transistor. Preferably, a control component, for example a switching transistor, is connected to the output of the charge pump as the connection.

According to an improvement, provision is made for the control circuit to be an analog circuit designed for continuous-time regulation.

The control circuit can be designed as a two-level controller. For two-level control here, the pumping of the charge pump is switched on at one point and switched off at the other point. Alternatively, the control circuit carries out three-level control. Here, the charge pump can have a pump level with reduced pump output and another level with maximum pump output.

In another embodiment, the control circuit can have a comparator. The comparator is preferably designed as a window comparator. The window comparator has hysteresis. The window comparator is also called a window discriminator or Schmitt trigger.

The comparator can be connected to compare the difference, or a quantity derived from the difference, with a reference value. A number of voltage dividers and/or amplifiers, for example, are connected in order to derive a quantity from the difference.

In an embodiment, provision is made that the control circuit has a subtractor, which is connected to the inputs of the control circuit through voltage dividers.

The control circuit can have a switch for switching a pump clock. The pump clock at the clock input of the charge pump can be switched on and off using the switch. In this arrangement, the clock input serves as a control input.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
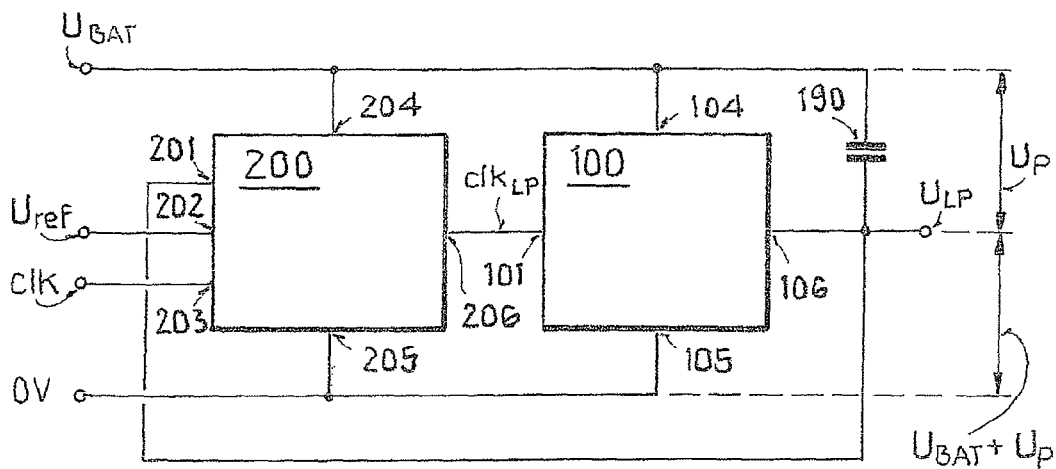
FIG. 1 is a first schematic block diagram of a circuit.

In FIG. 1, a circuit is shown as a schematic block diagram. The circuit has a charge pump 100 and a control circuit 200. An input 210 of the control circuit 200 is connected to the pump output 106 of the charge pump 100. A terminal 105 of the charge pump 100 is connected to ground 0V. In addition, a terminal 205 of the control circuit 200 is connected to ground 0V.

By means of the circuit, the effect is achieved that the charge pump 100 adds a defined and adequately stable voltage $U_P$ to the external supply voltage $U_{BAT}$. To this end, the control circuit 200 has a terminal 204 connected to a supply voltage terminal of the supply voltage $U_{BAT}$. The following applies for the resulting output voltage $U_{LP}$ of the charge pump 100:

$$U_{LP} = U_{BAT} + U_P \quad (1)$$

As soon as a difference between the output voltage $U_{LP}$ of the charge pump 100 and the supply voltage $U_{BAT}$ exceeds a setpoint, it is stopped by the control circuit 200 so that the charge pump 100 ceases operation. The setpoint here depends on a reference voltage $U_{ref}$. The charge pump activity only resumes when the difference (between the output voltage $U_{LP}$ and the supply voltage $U_{BAT}$) at the pump output 106 drops below the setpoint as a result of the withdrawing of charge from the reservoir capacitor 190. The activity of the charge pump 100 takes place by means of the masking or blanking of the pump clock $clk_{LP}$, which can be applied to a pump input 101 of the charge pump 100. To this end, the control circuit 200 has a clock input 203 for a clock signal clk. The pump clock $clk_{LP}$ is produced from the clock signal clk as a function of the regulation by the control circuit 200.

The control circuit 200 also can have a monitoring circuit, which monitors the output voltage $U_{LP}$ of the charge pump 100 for a minimum value. The output voltage $U_{LP}$ is considered adequate when it exceeds the supply voltage $U_{BAT}$ by 6 V. A flag for a fault in the charge pump 100 is output if the minimum value cannot be reached or if the output voltage $U_{LP}$ drops below 5 V over the supply voltage $U_{BAT}$ as a result of excessive current draw.

Figure 2:
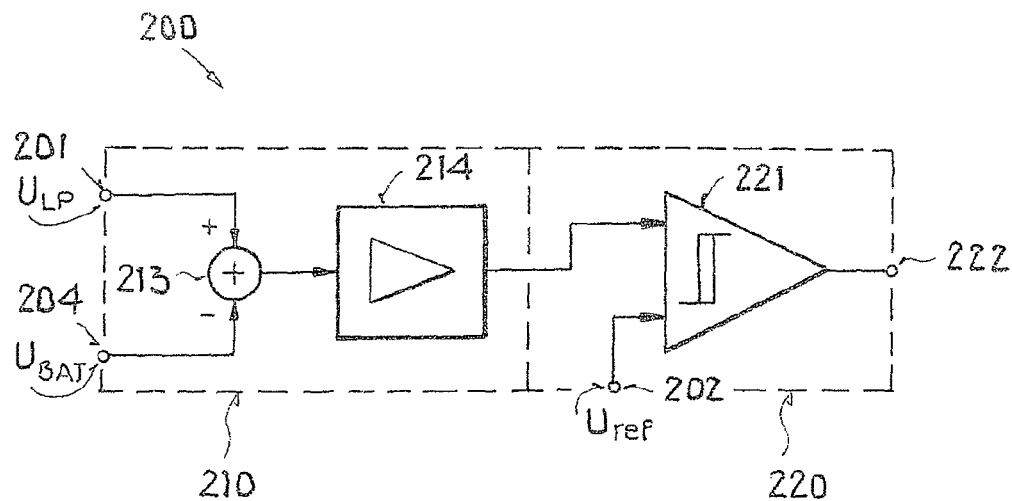
FIG. 2 is a schematic representation of a functional principle.

FIG. 2 shows the signal processing of the regulation that is functionally implemented by means of a difference scaling stage 210 and a comparator stage 220. The difference of the output voltage $U_{LP}$ of the charge pump 100 and the supply voltage $U_{BAT}$ at the terminal 204 is produced by means of a subtractor 213. The difference is scaled by means of a block 214. For this purpose, the block 214 has a number of voltage dividers and/or a number of drivers, for example. The output signal of the block 214 is evaluated. To this end, the output signal is compared to a number of thresholds that are derived from a reference voltage $U_{ref}$ at the input 202.

Figure 3:
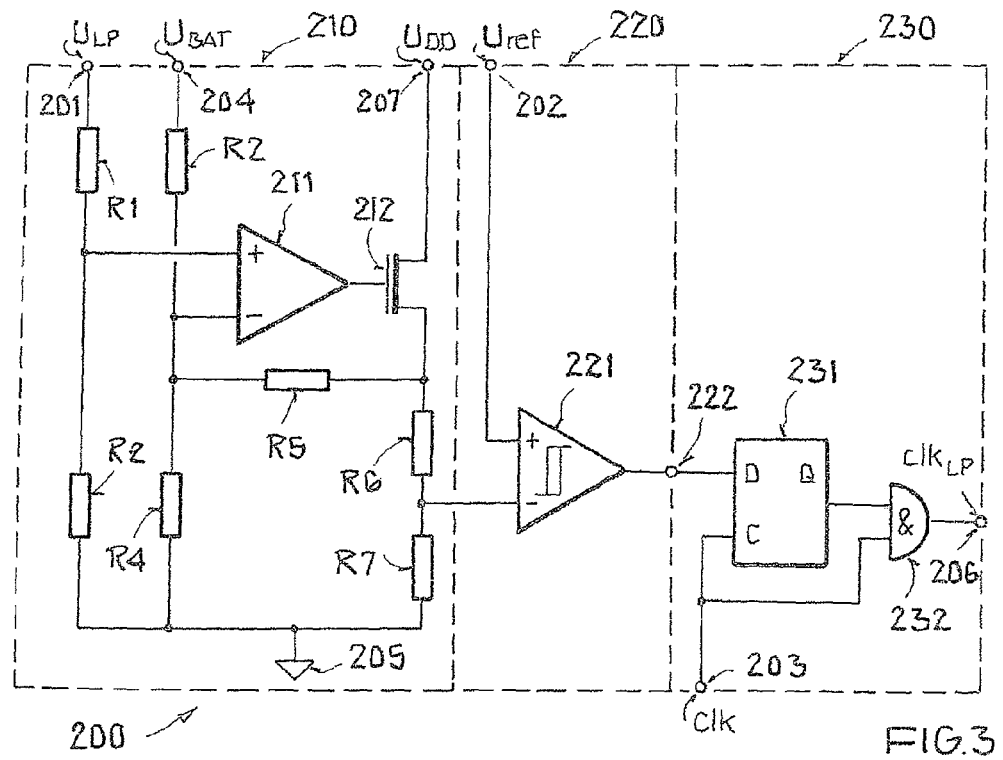
FIG. 3 is a schematic block diagram of a control circuit.

One example embodiment of an implementation of a regulation is shown schematically as a circuit diagram in FIG. 3. The control circuit 200 once again has a difference scaling stage 210 and a comparator stage 220 and a gate stage 230. The gate stage 230 is designed as a clock/gating cell. The gate stage 230 has a flip-flop 231 and an AND gate 232. The clock signal clk is present at the clock input 203, and can be switched to the output 206 by the flip-flop 231 and the AND gate 232. As a result of the switching function of the gate circuit 230, the pump clock $clk_{LP}$ can be changed by blanking. In particular, it is possible to switch the pump clock $clk_{LP}$ on and off.

The output 222 of the comparator stage 220 is directly connected to the D input of the flip-flop 231. The comparator stage 220 has a window comparator 221 with hysteresis, which compares the input signal to a reference signal $U_{ref}$ present at its reference input 202. The input of the window comparator 221 is connected to the output of the difference scaling stage 210.

The difference scaling stage 210 has a differential amplifier 211 whose inputs are each connected to a voltage divider formed by the resistors R1, R2 and R3, R4. The output of the differential amplifier 211 is connected to a transistor 212 and is also fed back through the resistor R5, so that the differential amplifier 211 is connected to the resistors R1 through R5 and the transistor 212 as a subtractor. The output of this subtractor is connected to the voltage divider having resistors R6 and R7, which scale the output voltage of the differential amplifier 211. Another terminal of the transistor 212 is connected to the terminal 207 for connection to a regulated voltage $U_{DD}$ (for example, 5 V).

The subtraction and scaling are effected with the continuous-time analog circuit 210. The function of this circuit component 210 is based on the ratio of the resistors R1 through R7. The resistor values are chosen such that upon reaching the desired output voltage $U_{LP}$ of the charge pump 100, the voltage across the resistor R7 exactly matches the reference voltage $U_{ref}$.

The comparison is implemented with the window comparator 221. The latter has hysteresis, so that the output signal of the window comparator 221 switches to low (ground) one-half hysteresis width below the reference voltage $U_{ref}$, for example, and so that the output signal of the window comparator 221 switches to high ($U_{DD}$) one-half hysteresis width above the reference voltage $U_{ref}$, for example.

The output signal of the window comparator 221 is used in the subsequent gate stage 230 for blanking of the clock signal clk for pump operation. When the window comparator 221 outputs a low signal, the clock is passed on to the charge pump 100 as the pump clock $clk_{LP}$. When the window comparator 221 outputs a high signal, the clock clk is masked off by the flip-flop 231 and the AND gate 232, so that the output of the gate stage 206 remains constant at a fixed voltage (low) during the masking until the window comparator 221 switches back to high as a result of the difference between the pump voltage $U_{LP}$ and the supply voltage $U_{BAT}$ decreasing below a threshold.

Figure 4:
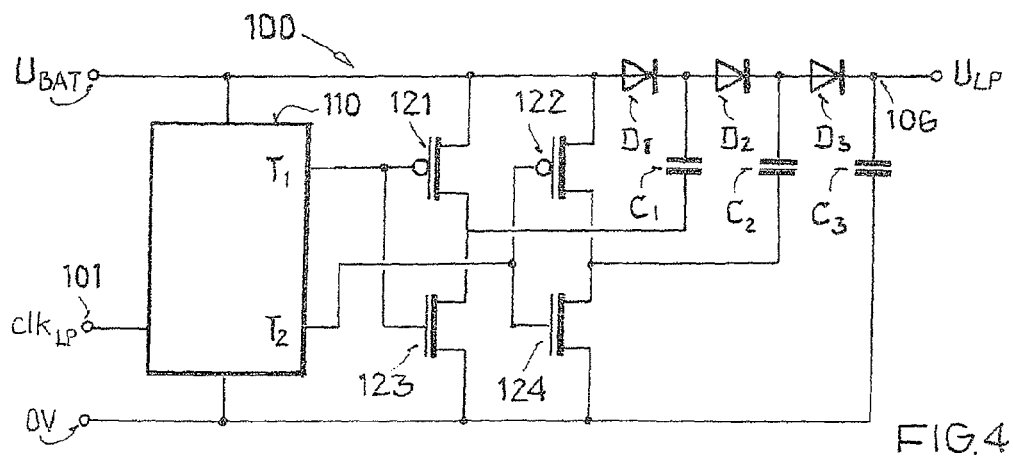
FIG. 4 is a schematic block diagram of a charge pump.
Figure 5:
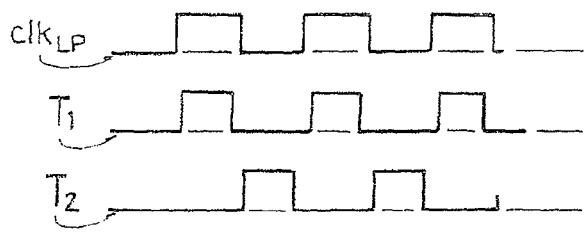
FIG. 5 is a schematic diagram with control signals.

FIG. 4 schematically shows a circuit of a charge pump 100 by means of a circuit diagram. The charge pump 100 is connected to a supply voltage $U_{BAT}$ and a ground terminal 0V, and provides an output voltage $U_{LP}$ at its output 106. The charge pump 100 also has a pump clock input 101 for the pump clock $clk_{LP}$. The pump clock signal $clk_{LP}$ is, for example, a square wave signal such as is shown in FIG. 5 in the form of a diagram. The charge pump 100 also has a control circuit 110, four transistors 121, 122, 123, 124, three diodes D1, D2, D3, and three capacitors C1, C2, C3. All components of the charge pump 100 except for the three capacitors C1, C2, C3 are monolithically integrated on a semiconductor chip, while the capacitors C1, C2, C3 can be connected to terminals of the semiconductor chip.

The principle of the charge pump 100 shown in FIG. 4 makes it possible, neglecting the voltage drops across the diodes D1 through D3, to increase the input voltage $U_{BAT}$ (supply voltage) by a factor of N+1 with an N-stage arrangement. In the example embodiment in FIG. 4, N is 2 here. As is evident from the clock diagram in FIG. 5, the stages are driven without overlap by the signals T1 and T2. It is assumed that the capacitors C1 and C2 are initially discharged, and C3 is charged nearly to $U_{BAT}$. With the first pulse on T1, the capacitor C1 is charged to $U_{BAT}$. In the subsequent pulse on T2, C1 is discharged into C2. Following this (T1 again), C1 is recharged and C2 is discharged into C3. Since C3 was already charged to $U_{BAT}$, C2 can only discharge by charging C3 above the voltage $U_{BAT}$. Charge is drawn from $U_{BAT}$ for every charging and charge transfer operation.

A control circuit according to FIG. 3 now ensures that the output voltage $U_{LP}$ of the charge pump 100 is typically at $U_{BAT}$+15 V. For this purpose, the output voltage $U_{LP}$ must be monitored. The feedback path shown in FIG. 1 from the output 106 of the charge pump 100 to the input 210 of the control circuit 200 is provided for this purpose. As soon as the output voltage $U_{LP}$ exceeds the setpoint $U_{BAT}$+15 V, the pump activity of the charge pump 100 is interrupted. Although the regulation of the output voltage of the charge pump 100 is limited to a significantly lower value than $3*U_{BAT}$, the charge balance is preserved. For this reason, the charge pump 100 consumes three times as much current (Q/t averaged) as is drawn at the output.

The invention is not restricted to the variant embodiments shown in FIGS. 1 through 5. For example, it is possible to use a different type of charge pump. It is also possible, in principle, to use a three-level controller with a pump clock that is switched off and on and a change in the number of stages N of the charge pump.

When the supply voltage $U_{BAT}$ varies over a large range, the control circuit can advantageously be designed as a three-point regulator. The number of active pump stages of the charge pump can be controlled as a function of the supply voltage $U_{BAT}$. To this end, the supply voltage $U_{BAT}$ can be measured and evaluated, by means of an analog-to-digital converter or threshold switch for example. For a very high supply voltage $U_{BAT}$, only one stage of the charge pump is active in the best case (N=1), so that only twice the load current need be drawn from the supply (battery). In contrast, for very low supply voltages $U_{BAT}$, all stages of the charge pump operate in order to achieve the required output voltage. However, the supply current also increases in this case.

The functionality of the circuit in FIG. 1 is preferably used for a load bridge, for example a full bridge or half bridge in a circuit for a motor vehicle. Here, when supplied from a motor vehicle battery the case may arise that the battery voltage varies significantly, in particular being increased above a voltage of 12 V when starting the generator or decreasing below a voltage of 12 V when starting the engine.

The output of the charge pump can be connected to a control terminal of a high-side NMOS transistor of the bridge in order to switch the high-side NMOS transistor to a low-resistance state. The high-side NMOS transistor is also connected to the supply voltage $U_{BAT}$, where the difference between the output voltage of the charge pump and the supply voltage $U_{BAT}$ defines the switching state of the high-side NMOS transistor. In the low-resistance state, the high-side NMOS transistor connects a load, for example a motor, to the supply voltage $U_{BAT}$.

As a result of the regulation by means of the difference between the output voltage of the voltage pump [sic] and the supply voltage, the effect is achieved, in contrast to an unregulated output voltage, that the high-side NMOS transistor of the bridge is driven on sufficiently even at low battery voltages (e.g., 9 V) to achieve a low turn-on resistance of the high-side NMOS transistor, and that the high-side NMOS transistor is not damaged by an excessive control voltage ($N*U_{BAT}$) at very high battery voltages (e.g., 16 V).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit comprising:
    a charge pump configured to be connectable to a supply voltage terminal to produce a pump voltage from a supply voltage; and
    a control circuit having at least one input connectable to an output of the charge pump and to the supply voltage terminal to sense a difference between the pump voltage and the supply voltage as a controlled variable,
    wherein the control circuit is configured to compare the controlled variable to a reference variable, and
    wherein an output of the control circuit is connectable to a control input of the charge pump to control the charge pump as a function of the comparison.

2. The circuit according to claim 1, further comprising a power transistor connectable to the supply voltage terminal, wherein the output of the charge pump is connectable to a control input of the power transistor.

3. The circuit according to claim 1, wherein the control circuit is an analog circuit configured for continuous-time regulation.

4. The circuit according to claim 1, wherein the control circuit is a two-level controller.

5. The circuit according to claim 1, wherein the control circuit has a comparator or a window comparator configured to compare a difference or a quantity derived from the difference between the pump voltage and the supply voltage with a reference value.

6. The circuit according to claim 5, wherein the control circuit has a subtractor connectable to the input of the comparator via voltage dividers.

7. The circuit according to claim 1, wherein the control circuit has a switch for switching a pump clock at a clock input as a control input of the charge pump.

8. The circuit according to claim 1, wherein a difference measurement between the supply voltage and the pump voltage is provided, for regulating the difference between the supply voltage and the pump voltage, to a gate voltage for switching on a high-side transistor of a load bridge.

9. A method for regulation with a charge pump, the method comprising:
    measuring a difference between a pump voltage at an output of a charge pump and a supply voltage;
    comparing the difference or a quantity derived from the difference to a reference value; and
    changing a control signal that controls the charge pump as a function of the comparison to produce the pump voltage from the supply voltage.

10. The method according to claim 9, wherein the control signal is activated or deactivated.

* * * * *